Dec. 6, 1960　　　O. MÄRZ　　　2,962,732
BOAT
Filed Feb. 23, 1955　　　　　　　　　　　　5 Sheets-Sheet 1
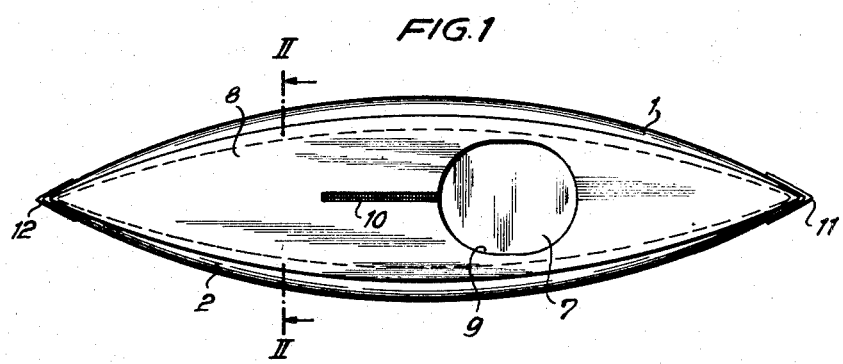
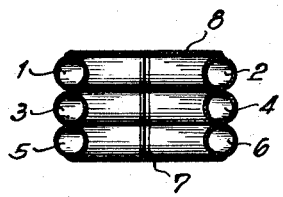
INVENTOR
Otto März
by:
Michael S. Striker
agt.

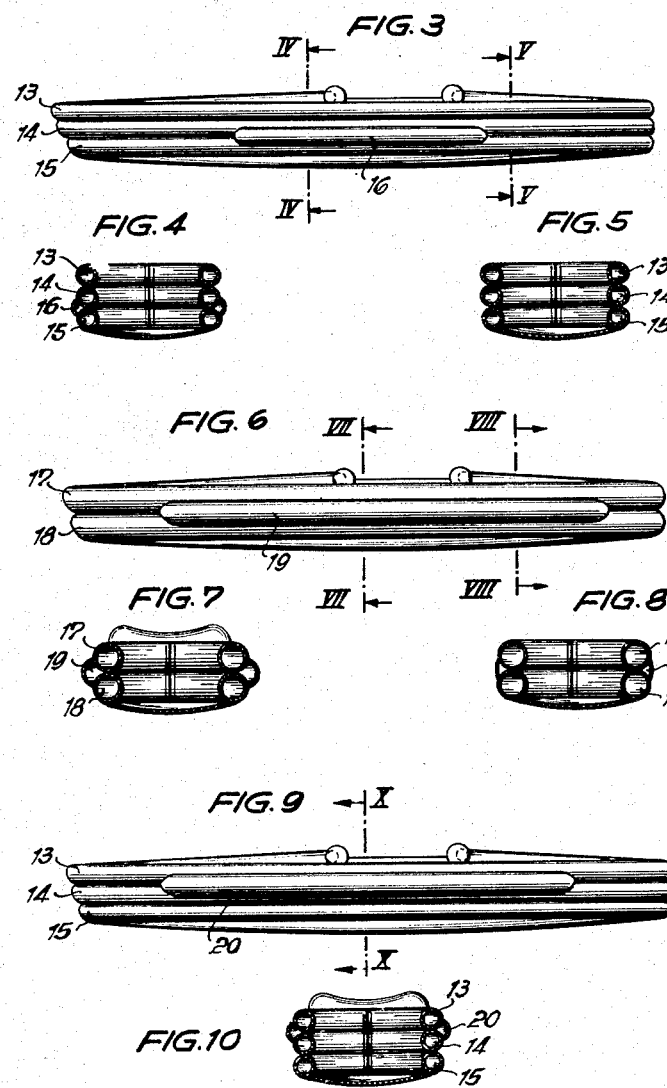

Dec. 6, 1960 O. MÄRZ 2,962,732
BOAT
Filed Feb. 23, 1955 5 Sheets-Sheet 3

INVENTOR
Otto März
by:
Michael S. Striker
agt.

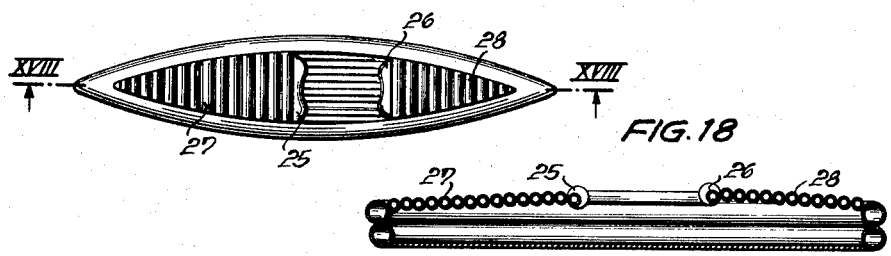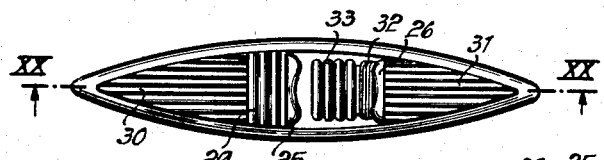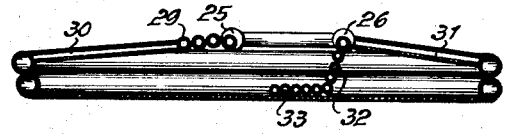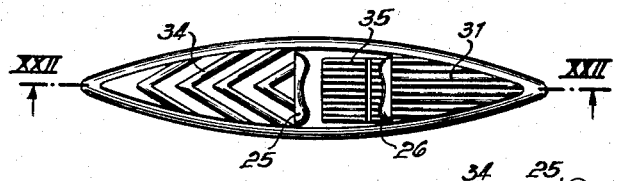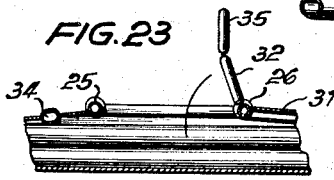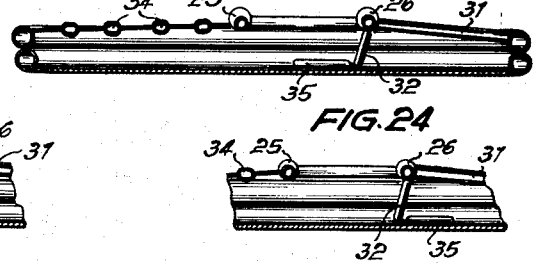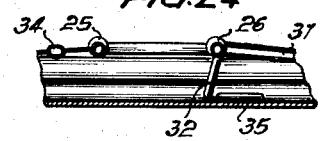

Dec. 6, 1960 O. MÄRZ 2,962,732
BOAT
Filed Feb. 23, 1955 5 Sheets-Sheet 5

INVENTOR
Otto März
by:
Michael S. Striker
agt.

United States Patent Office 2,962,732
Patented Dec. 6, 1960

2,962,732

BOAT

Otto März, Munich, Germany, assignor to Firma Metzeler Gummiwerk A.G., Munich, Germany Filed Feb. 23, 1955, Ser. No. 489,950

6 Claims. (Cl. 9—2)

The present invention refers to a boat, and more particularly to a foldable boat in form of a canoe constructed from inflatable cells made from rubber or rubber-substitute or material covered and/or impregnated with those.

Boats formed from tube-like inflated cells are known. Such boats can be rolled together in deflated condition and can be very easily transported in this state. Therefore, such boats are used quite extensively by the army, the navy and for various sports and they have found an extensive use especially as landing boats. But so far these boats have been built only in float-like or tub-like shape. One disadvantage of these boats is their relative bulky wide shape and their relative high center of gravity, which makes the same difficult to navigate and unstable. These boats therefore cannot compete with streamlined folding boats in which a foldable frame construction is covered by a water-tight skin. To overcome this defect it has already been suggested to make inflatable boats in the streamlined form of folding boats by providing air and water-tight cells within such folding boats in the form of air- and water-tight compartments in the front, middle or rear part of the boat. These cells or compartments are partly supported within itself. Boats built according to this principle have the disadvantage that they capsize very easily.

It is one object of the present invention to construct frameless inflatable boats of a streamlined canoe shape.

A further object of this invention is to construct streamlined canoe-shaped inflatable boats which are very stable in use.

An additional object of the present invention is a construction for inflatable boats which is rigid and at the same time simple.

It is also an object of the present invention to construct a boat which is very comfortable to the user of the same.

With the above objects in view, the present invention mainly consists in a boat comprising, in combination, a pair of hollow gas-filled flexible side wall means interconnected at their ends, located opposite each other, and spaced from each other between the ends, the pair of side wall means defining between themselves an elongated substantially oval space having a given length between the interconnected ends of the pair of side wall means when the latter are unstressed, the pair of side wall means each having a top portion and a bottom portion, and bottom wall means connected to the bottom portions of the pair of side wall means and extending therebetween, the bottom wall means also being connected to the ends of the side wall means, being made of a substantially nonstretchable material, and having a length between the ends of the side wall means which is shorter than the given length so that the pair of side wall means maintain the bottom wall means under tension.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows a top view of a boat according to the present invention;

Fig. 2 shows a section along the lines 2—2 of Fig. 1;

Fig. 3 shows a side view of one modification of the present invention;

Fig. 4 is a sectional view showing a section along the lines 4—4 of Fig. 3;

Fig. 5 is a sectional view showing a section along the lines 5—5 of Fig. 3;

Figure 11:
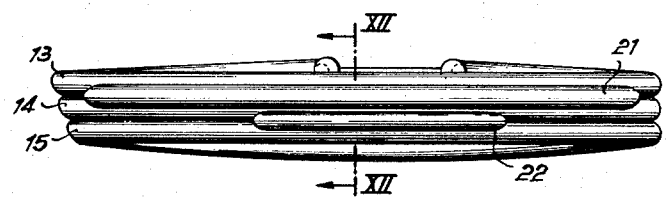
Figure 12:
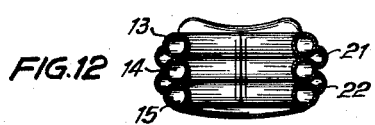
Figure 13:
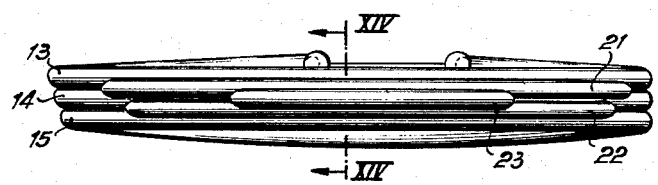
Figure 14:
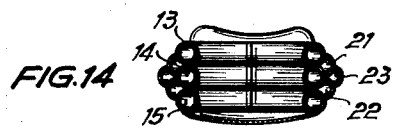
Figure 15:
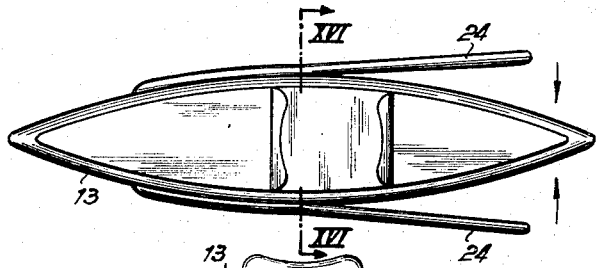
Figure 16:
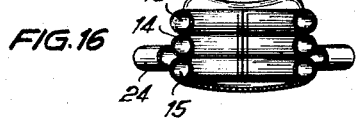
Figure 25:
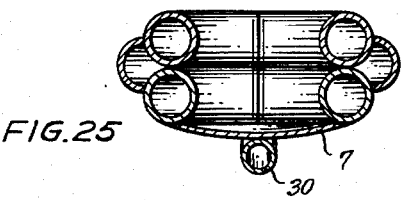
Figure 26:
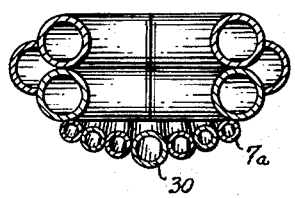
Figure 27:
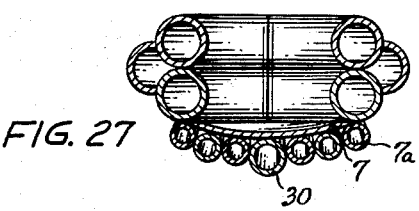
Figure 28:
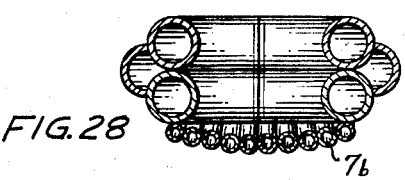
Figure 29:
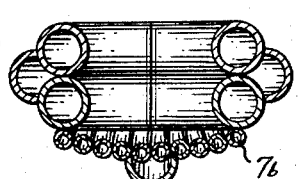
Figure 30:
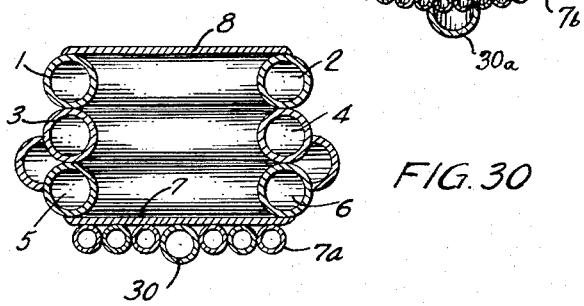

Figs. 6, 9, 11, and 13 are side views showing slightly modified forms of the present invention;

Figs. 7 and 8 are sectional views showing, respectively, sections along the lines 7—7 and 8—8 of Fig. 6;

Fig. 10 is a sectional view showing a section taken along the lines 10—10 of Fig. 9;

Fig. 12 is a sectional view showing a section taken along the lines 12—12 of Fig. 11;

Fig. 14 is a sectional view of a section taken along the lines 14—14 of Fig. 13;

Fig. 15 is a top view showing a modification of the present invention;

Fig. 16 is a sectional view showing a section taken along the lines 16—16 of Fig. 15;

Figs. 17, 19 and 21 are top views showing slight modifications of the top construction of the present invention;

Fig. 18 shows a longitudinal section taken along the lines 18—18 of Fig. 17;

Fig. 20 is a longitudinal section taken along the lines 20—20 of Fig. 19;

Fig. 22 is a longitudinal section taken along the lines 22—22 of Fig. 21;

Figs. 23 and 24 are partial sectional views similar to Fig. 22 showing different positions for elements shown in Fig. 22;

Figs. 25 to 29 are sections taken along the section-lines of Fig. 6, respectively Figures 3, 6, 9, 11 and 13 for boats with bottom-walls provided with stiffening or stabilizing ribs, and Fig. 30 is a modification of the construction shown in Figure 2 adding the features shown in Figure 27 thereto.

Referring now to the drawing and especially to Figs. 1 and 2 of the same, the side walls of the boat of the present invention are formed by a plurality of inflated tubular or hose-like cells made from rubber or rubber-substitute or material covered and/or impregnated with those. The cells of each side wall are arranged longitudinally from bow to stern in substantially parallel layers and the cells on each side wall are adjacent to each other to form a water-tight wall unit. All such layers, made of fluid-tight material, are united to each other by said material to form fluid-tight walls. Each of said layers can be formed of two separate tubes connected to each other at the bow and stern or each of said layers may be formed of a single tube having free ends and being bent in an acute angle at the center between the free ends to form for instance the bow of the boat whereas the free ends themselves may be sealed or welded and united to each other to form the stern of the boat. The portions 1, 2; 3, 4; and 5, 6 shown in Fig. 2 may therefore consist respectively of two individual cells or of one cell each bent to form the two side walls as described above.

The two side walls are connected to each other at the ends 11 and 12 of the boat and diverge from these ends towards the middle of the boat defining between themselves an elongated substantially oval space and these side walls have, in unstressed condition, a given length between the interconnected ends 11 and 12. The opening between the bottom cells 5 and 6 (as shown in Fig. 2) is closed by bottom sheet 7 which is preferably made of one layer or a plurality of layers of fluid-tight rubber-impregnated substantially non-stretchable material. This bottom sheet 7 has an elongated shape pointed at the ends 11 and 12 and is connected all along the bottom of cells 5 and 6. The length of this bottom sheet 7 between the points 11 and 12 is shorter than the length of the side walls in unstressed condition and therefore the attached bottom sheet 7 keeps the side walls in the bowed condition as described above, whereby the inflated side walls tend to stretch the bottom sheet 7 which is therefore in a stressed condition. This particular dimensioning and arrangement of the bottom sheet 7 results in a simple and at the same time rigid boat construction which has not been obtained in any of the constructions known so far.

The front and rear edges 11 and 12 of the boat are preferably reinforced in a prow-like manner by separate layers of material cemented to the side walls at these locations. The top opening of the boat is preferably likewise covered by a spray cover 8 reaching from bow to stern. This top cover 8 is made of similar material as the bottom sheet 7 and is cut to similar dimensions so that this top cover 8 also exerts a stiffening effect on the side walls as described in connection with the bottom sheet 7. An entrance opening 9 is provided in the top cover 8. This entrance opening surrounds the body of the user of the boat closely and is preferably made with an additional slot to facilitate the entrance in or the exit from the boat. This slot is preferably closed during the use of the boat by a slide fastener 10 or similar means.

Each pair of cell bodies 1, 2; 3, 4; 5, 6 may be furnished with a valve to inflate or deflate respectively the cell bodies in a well known manner, which valves are not shown in the drawings.

To stabilize the boat further and to secure it against damage of the outside hull an additional cell body may be provided on the outside of the wall cells in a location where two of these wall cells meet each other. Figures 3 to 14 illustrate different variations in which these outer cells may be attached to the side walls.

Fig. 3 shows side walls formed of three inner cell layers 13, 14 and 15, and an outer cell body 16 arranged between cell layers 14 and 15. This outer cell body 16 is preferably made shorter than the inner cell layers and is arranged in the middle section of the boat. Figures 4 and 5 show sections illustrating this particular arrangement.

Figure 6 shows a boat wherein the side walls are formed by two inner layers 17 and 18 only and the outer cell 19 is arranged between these two layers. This outer cell 19 is again made shorter than the two inner cells and it is also arranged in the middle portion of the boat. Figures 7 and 8 show again cross sections through this particular construction. In Figure 8 a variation is shown where this outer cell 19 is under less air pressure than the inner layers and bulges therefore very little beyond the two inner layers.

An additional slight variation is shown in Figure 9 where the outer layer 20 is arranged between the two top layers 13 and 14 of the three inner layers. Figure 10 again shows a cross section through this particular construction.

Figure 11 shows a boat construction where two outer cell bodies 21 and 22 are superimposed between three inner layers 13, 14 and 15 on each side of the boat walls. In this construction the outer cell 21 nearer to the top portion of the boat is preferably made longer than the lower outer cell body 22 and both are arranged approximately symmetrically in the middle section of the boat.

Figure 12 shows again a cross section through this boat construction.

Figure 13 shows a boat construction where each side wall of the boat is formed by three superimposed layers. As clearly shown in Figure 13 intermediate layers 21 and 22 are arranged outside the inner layers 13, 14, 15 and an outer layer 23 is arranged superimposed and between the intermediate cell bodies 21 and 22. In this case the outer cell body 23 is preferably made shorter than intermediate cell bodies 21 and 22 which in turn are again shorter than the inner cell bodies 13, 14 and 15. This particular construction provides an especially stable boat, which is especially secured against any damage. As can be clearly seen from the cross section shown in Fig. 14 the outer cell body forms with the intermediate cell bodies and the inner cell bodies a honeycomb-like structure.

Figure 15 and the corresponding cross section shown in Figure 16 illustrate another variation of a boat construction in which the outer cell bodies 24 are built in the form of outriggers. These cell bodies 24 are attached only with their front portions between the inner cells 14 and 15 of the boat wall, whereas the rear portions of these cell bodies 24 extend under an angle away from the boat walls. These outriggers are especially adapted to keep the boat in stable condition and to prevent it from capsizing.

Figures 17, 19, 21 and the corresponding cross sections shown in Figures 18, 20 and 22 show different constructions for the boat cover. In all these constructions the boat cover is not simply formed by a single sheet, as shown in Figure 1, but the cover constructions illustrated in the mentioned figures include also inflated cell bodies which are arranged in different patterns in the various figures. Common to all variations are cell bodies 25 and 26 arranged transversely in the boat and respectively on both sides of the entrance opening. These transverse cell bodies 25 and 26, made of fluid-tight material, are united to each other respectively to the body, i.e. the top layer, of the boat by said material thus forming additional stiffening means between the side walls of the boat.

Figure 17 and the corresponding cross-section 18 show a plurality of transverse cell bodies 27 and 28 respectively arranged adjacent to each other between cell body 25 and the bow of the boat and between cell body 26 and the boat stern. Cell bodies 27 and 28 form respectively spray covers for the front and rear section of the boat. Cell bodies 27 and 28 are also connected to each other respectively to cell bodies 25 and 26 to a material unit. Figure 19 and the corresponding cross section shown in Figure 20 differ from the construction shown in Figures 17 and 18 only insofar as the cell bodies 30 and 31 forming respectively the front and rear cover of the boat are arranged longitudinally instead of transversely. In this boat additional cell bodies 29 in the immediate neighborhood of cell body 25 are united with them materially and arranged transversely, but these cell bodies could also be omitted and the cell bodies 30 could be connected directly to cell body 25.

The construction illustrated in Figure 21 and the corresponding cross section shown in Figure 22 differs from the above-described constructions only insofar as the front cover is made by a cover sheet in which cell bodies 34 are arranged in an arrow-like pattern.

Figures 19 and 21 as well as the corresponding cross-section shown in Figures 20 and 22 illustrate also a seat construction for these boats. These seats are formed by inflated tubes arranged adjacent and connected to each other. In Figures 19 and 20 these tubes are arranged transversely in the boat whereby tubes 32 form the back rest and tubes 33 the seating portion of the seat. In Figures 21 and 22 these tubes forming the seat are arranged longitudinally in the boat and the cell bodies 32 form again the back rest of the seat and cell bodies 35 hingedly connected to cell bodies 32 form the portion on which the user of the boat can sit.

Figures 23 and 24 show how these seat portions 32 and 35 are connected respectively to the cross stiffener 26 and to each other and how they can be turned out of the boat for cleaning purposes and how the part 35 can be stored in the rear compartment of the boat if the user wants to sit directly on the boat bottom.

To inflate the cell bodies of the boat, valves, preferably check valves, are used in a well-known manner. Different valves may be arranged for each of the cell layers or a common distributor valve may be provided. If desired, a bellows or similar means to simplify the inflation of the boat can be furnished with the boat.

To increase the stability of the boat some of the cell bodies forming the side walls and preferably the lowest cell bodies in the side walls may be adapted to be filled with water instead of being inflated by air or gas. In this case the center of gravity of the boat is lowered and the boat lies more stable in the water.

Figures 25 to 29 show a bottom-wall with stiffening and/or stabilizing ribs running longitudinally. Figure 25 shows a bottom wall supporting a stabilizing rib 30 only connected to said wall. In Figure 26 the bottom-wall is comprised of a plurality of tubes or hoses 7a. Said tubes limit the rib 30 of a great diameter and are tightly connected to them and to each other. According to Figure 27 the usual bottom-wall 7 is supporting the tubes 30, 7a. Figure 28 shows a bottom-wall 7b formed by tubes or hoses of equal diameter. In Figure 29 the bottom-wall 7b according to Figure 28 is combined with a stabilizing tube 30a.

To transport the boat in the deflated condition a cover for folding the deflated boat therein is preferably supplied with the boat.

The boat can further be provided with water-tight containers for the storage of food or clothing in the boat.

It will be understood that each of the elements described above, or two or more together, may also find a useful application in other types of boats differing from the types described above.

While the invention has been illustrated and described as embodied in a boat formed of inflatable cells, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A boat comprising, in combination, a pair of inflated resilient side walls interconnected at their ends, located opposite each other, and spaced from each other between said ends, said pair of side walls defining between themselves an elongated substantially oval space, said interconnected ends being at a given distance from each other when said pair of side walls are unstressed, said pair of side walls each having a top portion and a bottom portion, and being formed by a plurality of inner tubular gas-filled cells, being arranged in longitudinal substantially parallel layers and being made of fluid-tight material, said layers being united to each other by said material to form fluid-tight walls, each of said layers being formed by a single cell forming part of both side walls and having free ends, each of said cells being bent centrally between said free ends to an acute angle to form one of said ends of said walls, and the free ends of the cell being united to each other and sealed to form the other end of said walls; outer inflated cells arranged stretching longitudinally at the outer surface of each of said walls at portions of said walls where said inner cells meet; and a bottom wall made of fluid-tight substantially non-stretchable material connected to the cell at said bottom portion of said pair of side walls and extending therebetween, said bottom wall also being connected to the ends of said side walls and having a length between said ends of said side walls which is shorter than said given distance so that said pair of side walls maintain said bottom wall under tension and so that said bottom wall bulges said pair of side walls away from each other.

2. A boat as set forth in claim 1 wherein at least one of said outer inflated cells is made in form of an outrigger having two end portions, one of said end portions being connected to said inner cells and the other extending at an angle away from said inner cells.

3. A boat comprising, in combination, a pair of inflated resilient side walls interconnected at their ends, located opposite each other, and spaced from each other between said ends, said pair of side walls defining between themselves an elongated substantially oval space, said interconnected ends being at a given distance from each other when said pair of side walls are unstressed, said pair of side walls each having a top portion and a bottom portion, and being formed by a plurality of inner tubular gas-filled cells, being arranged in longitudinal substantially parallel layers and being made of fluid-tight material, said layers being united to each other by said material to form fluid-tight walls, each of said layers being formed by a single cell forming part of both side walls and having free ends, each of said cells being bent centrally between said free ends to an acute angle to form one of said ends of said walls, and the free ends of the cell being united to each other and sealed to form the other end of said walls; a plurality of outer inflated cells arranged stretching longitudinally at the outer surface of each of said walls at portions of said walls where said inner cells meet, said outer cells on each wall spaced from each other and the outer cell nearer to the top portion of each of said walls longer than the outer cell nearer to the bottom portion thereof; and a bottom wall made of fluid-tight substantially non-stretchable material connected to the cell at said bottom portion of said pair of side walls and extending therebetween, said bottom wall also being connected to the ends of said side walls and having a length between said ends of said side walls which is shorter than said given distance so that said pair of side walls maintain said bottom wall under tension and so that said bottom wall bulges said pair of side walls away from each other.

4. A boat comprising, in combination, a pair of inflated resilient side walls interconnected at their ends, located opposite each other, and spaced from each other between said ends, said pair of side walls defining between themselves an elongated substantially oval space, said interconnected ends being at a given distance from each other when said pair of side walls are unstressed, said pair of side walls each having a top portion and a bottom portion, and being formed by a plurality of inner tubular gas-filled cells, being arranged in longitudinal substantially parallel layers and being made of fluid-tight material, said layers being united to each other by said material to form fluid-tight walls, each of said layers being formed by a single cell forming part of both side walls and having free ends, each of said cells being bent centrally between said free ends to an acute angle to form one of said ends of said walls, and the free ends of the cell being united to each other and sealed to form the other end of said walls; intermediate inflated cells arranged stretching longitudinally at the outer surface of each of said walls at portions of said walls where said inner cells meet; outer cells of similar construction and arranged in a similar way as said intermediate cells at the outside of said intermediate cells, said inner cells, intermediate cells, and outer cells forming a honeycomb-like structure; and a bottom wall made of fluid-tight substantially non-stretchable material connected to the cell at said bottom portion of said pair of side walls and extending therebetween, said bottom wall also being connected to the ends of said side walls and having a length between said ends of said side walls which is shorter than said given distance so that said pair of side walls maintain said bottom wall under tension and so that said bottom wall bulges said pair of side walls away from each other.

5. A boat as set forth in claim 4 wherein said intermediate cells are shorter than said inner cells and said outer cells are again shorter than said intermediate cells.

6. A boat comprising, in combination, a pair of inflated resilient side walls interconnected at their ends, located opposite each other, and spaced from each other between said ends, said pair of side walls defining between themselves an elongated substantially oval space, said interconnected ends being at a given distance from each other when said pair of side walls are unstressed, said pair of side walls each having a top portion and a bottom portion, and being formed by a plurality of tubular gas-filled cells, being arranged in longitudinal substantially parallel layers and being made of fluid-tight material, said layers being united to each other by said material to form fluid-tight walls, each of said layers being formed by a single cell forming part of both side walls and having free ends, each of said cells being bent centrally between said free ends to an acute angle to form one of said ends of said walls, and the free ends of the cell being united to each other and sealed to form the other end of said walls; a bottom wall made of fluid-tight substantially non-stretchable material connected to the cell at said bottom portion of said pair of side walls and extending therebetween, said bottom wall also being connected to the ends of said side walls and having a length between said ends of said side walls which is shorter than said given distance so that said pair of side walls maintain said bottom wall under tension and so that said bottom wall bulges said pair of side walls away from each other; and a plurality of spacing members being attached to the cell located at the top portion of said pair of side walls, said spacing members also being made of fluid-tight material, and two of said spacing members forming between themselves an entrance opening, said two spacing members being made in the form of inflated cells arranged transversely between said pair of side walls and connected to the top cell on each of said side wall to form a unit with the same.

References Cited in the file of this patent
UNITED STATES PATENTS

| | | |
|---|---|---|
| 1,372,528 | Marcovsky | Mar. 22, 1921 |
| 1,672,473 | Scheibert | June 5, 1928 |
| 1,792,140 | Brock | Feb. 10, 1931 |
| 2,334,072 | Cooper | Nov. 9, 1943 |
| 2,508,304 | Sturtevant | May 16, 1950 |
| 2,623,574 | Damsch | Dec. 30, 1952 |
| 2,739,321 | La Colette | Mar. 27, 1956 |

FOREIGN PATENTS

| | | |
|---|---|---|
| 326,420 | Great Britain | Mar. 13, 1930 |
| 576,108 | Great Britain | Mar. 19, 1946 |

OTHER REFERENCES
Popular Science, vol. 158, No. 6, June 1951.